United States Patent [19]
Goebel

[11] Patent Number: 5,513,092
[45] Date of Patent: Apr. 30, 1996

[54] PRECISION REGULATED LOW LOSS HIGH-POWER POWER SUPPLY

[75] Inventor: Klaus Goebel, Rheinstetten-Nwr., Germany

[73] Assignee: Bruker Analytische Messtechnik GmbH, Rheinstetten, Germany

[21] Appl. No.: 277,260

[22] Filed: Jul. 19, 1994

[30] Foreign Application Priority Data

Jul. 19, 1993 [DE] Germany .................. 43 24 150.6

[51] Int. Cl.$^6$ ..................... H02M 5/42
[52] U.S. Cl. ..................... 363/84
[58] Field of Search ............. 363/21, 37, 41, 363/45, 48, 52, 61, 81, 82, 84, 86, 125

[56] References Cited

U.S. PATENT DOCUMENTS

| | | | |
|---|---|---|---|
| 4,752,864 | 6/1988 | Clappier | 363/86 |
| 4,821,166 | 4/1989 | Albach | 363/44 |
| 4,945,464 | 7/1990 | Gunn | 363/61 |
| 5,301,095 | 4/1994 | Teramoto et al. | 363/37 |
| 5,341,279 | 8/1994 | Yamada | 363/21 |

OTHER PUBLICATIONS

"Very High Precision Current Regulated Power Supplies for Fermilab Antiprotion Source" by J. McCarthy et al. presented to The 1985 Particle Accelerator Conference at Vancouver, B.C., Canada, May 13, 1985.

"New Principle for Power Supplies for Synchrotron Magnets without Tracking Errors" by R. Wagnitz et al. in: Proceedings of the 2nd European Particle Accelerator Conference (EPAC 90, Nice, Jun. 12–16, 1990), vol. 2, pp. 1188ff.

*Primary Examiner*—Peter S. Wong
*Assistant Examiner*—Matthew V. Nguyen
*Attorney, Agent, or Firm*—Bookstein & Kudirka

[57] ABSTRACT

In an AC-powered power supply with a bipolar controller V controlling the instantaneous value of a control quantity measured by a sensor $F_1$ to a predetermined setting within a deviation of less than 0.1% at 1 Hz via the output DC current $I_o$, and with an adjustable rectifier EQ followed by a charging inductance $L_1$ and a filter capacitor $C_1$, whereby the output of controller V is electrically connected to the output line of the power supply, the output of controller V is AC-decoupled from filter capacitor $C_1$ by a decoupling inductance $L_2$, two potentials $V_o+V_1$ and $V_o-V_2$ are supplied to controller V, and a sensor $F_2$ is provided for the output current $I_2$ of controller V, which feeds an output signal to a control unit CTR which controls rectifier EQ in such a way that the mean value of output current $I_2$ of controller V is regulated to a minimum value. In this way, a stable and high precision control over the full frequency bandwidth is possible with high efficiency.

13 Claims, 3 Drawing Sheets

PRECISION REGULATED LOW LOSS HIGH-POWER POWER SUPPLY

BACKGROUND OF THE INVENTION

The invention concerns an AC-powered power supply with an output to feed a load L with a time-variable output DC current $I_o$ via an output line at electric potential $V_o$ and a return line at electric potential zero, with a bipolar controller V controlling the instantaneous value of an output quantity measured with a sensor $F_1$ in less than a second within a tolerance of 0.1% to a predetermined setting, and with an adjustable rectifier EQ followed by a charging inductance $L_1$ and a filter capacitor $C_1$, whereby the output of controller V is electrically connected to the output line of the power supply.

Such a power supply is for example known from the article "New Principle for Power Supplies for Synchrotron Magnets without Tracking Errors" by R. Wagnitz et al. in Proceedings of the 2nd European Particle Accelerator Conference EPAC 90, Nice, 12–16 Jun. 1990, Volume 2, pages 1188–1190.

Controlled power supplies are usually used to supply sensitive electric loads of most different kinds with an amount of electric energy which is as constant as possible and which is as optimally as possible adapted under changing conditions. For example, pulse-width-regulated switch controllers are known in the art, transforming, after power rectification, the generated DC voltage into controllable pulse-width variable current pulses, which, either directly or after high-frequency transformation, are again transformed to DC voltage. A disadvantage of such arrangements is the high frequency interference spectrum which in particular for higher powers is radiated directly out of the circuit leads, when the systems cannot be manufactured in a very compact way. Choice of a lower switching frequency with less interference increases the mechanical dimensions. For highly precise control circuits, the limitation of the control bandwidth which is given by the switching freqency (20 kHz to 500 kHz), is a substantial disadvantage. The efficiency of switching processes is higher than that of analog control circuits.

A different type of controlled power supplies are the so-called linear controllers or analog controllers. Hereby, the control transistors are not switched and their complete family of operating curves may be used. An advantage of these systems is their nearly ideal frequency response, which guarantees little phase shift up to the MHz range. In addition, if correctly dimensioned, there are always sufficient reserves even for large control amplitudes if large amplitude oscillations occur. However, a disadvantage of linear controllers is that, because of the use of the transistors as controlled resistors, a permanent Ohmic loss (10% –100%) has to be accepted, resulting in a rather low efficiency of such power supplies.

The efficiency of a linear controller can be improved if a pre-control element is employed. In this case, the complete theoretically possible family of operating curves between zero and full power is not used, rather the control is limited to the amplitude range of the actually occurring interferences in the control circuit. The linear controller on its own produces no high frequency interferences and is therefore particularly suitable if interference-sensitive apparatuses are used in its surroundings. However, the still high power losses remain a disadvantage, which in practice can hardly be reduced below 10%, since also for the linear controller with pre-controlling, the full output current is directed across the servo element.

In contrast, a considerably higher efficiency is obtained with an active filter for AC voltage. Such active filters are for example known from the article "Very High Precision Current Power Supplies for the FERMILAB ANTIPROTON SOURCE" by McCarthy et al., published in the "Particle Accelerator Conference at Vancouver, Canada", May 1985. In an active filter, a pre-controller with low bandwidth is used, which can be derived from the mains frequency or a multiple thereof. In addition, there is at least one additional controller which can be used in higher frequency ranges than that of the pre-controller. The control-variable of the control circuit is thereafter analysed and, depending on the actual value, control deviations in different frequency ranges are supplied to the different controllers. Interferences at higher frequencies can be compensated by active elements. By distributing the correction to different control channels, a comparatively high control bandwidth as well as a high amplification at relatively low power losses can be obtained, but such a power supply very soon becomes relatively complex for high power rates. All control channels following the pre-controller do not allow DC control since they are not electrically coupled. Use of a combination of different controllers with different phase and frequency responses makes it difficult to assemble a total family of operational curves for the power supply from the individual control steps which is suitable for stable control. Under certain operating conditions, oscillations are possible.

In a power supply according to the document cited at the beginning, a higher stability is reached by combining the active filter with a linear controller. However, the frequency response problems as well as the extremely high complexity of the arrangement for high control and amplification requirements also remain in this optimized prior art system. In addition, this system still needs a quadrature current of more than 3%, resulting in an average efficiency of at best 97%.

It is therefore the purpose of the present invention to introduce an AC driven power supply of the above mentioned kind which on the one hand is not limited in its bandwidth by the controller and which therefore operates extremely stably, and which on the other hand has a control efficiency of 99% or better and which can, finally, be realised by a very simple construction even for high output power and precision requirements.

SUMMARY OF THE INVENTION

This aim is achieved by the invention in a fashion which is surprisingly simple as well as effective in that the output of controller V is AC decoupled from filter capacitor $C_1$ by a decoupling inductance $L_2$, that controller V is supplied with two potentials $V_o+V_1$ and $V_o-V_2$, and that a sensor $F_2$ is provided for the output current $I_2$ of controller V, which supplies an output signal to a control unit CTR controlling rectifier EQ in such a way that the average of output current $I_2$ of controller V is adjusted to a minimum value.

Instead of rigidly allotting the control power to the individual frequency ranges as in the active filter, the arrangement of the invention uses only one distinguished ideal controller, which, however, has only a limited ability of amplitude swing, but can be built small and compact. The main load of the controlled current is not transferred through the controller itself but flows directly from the rectifier via charging inductance $L_1$ and decoupling inductance $L_2$ to the output line of the power supply. The controller, which determines the precision of the output quantity within the entire frequency spectrum, including DC, has an amplitude load which decreases towards low frequencies. In particular for DC current, controller V is unloaded and the control current $I_2$ no longer contains a DC component, whereas at high frequencies the controller itself can take over the complete amplitude.

The positive or negative compensation currents are either supplied by the source $V_o+V_1$ or discharged to cathode $V_o-V_2$ via the controller. The extremely small supply powers for the amplifier stages inside the controller itself can generally be provided by the potentials.

In a particularly preferred embodiment of the power supply according to the invention the potential $V_o+V_1$ supplied to controller V is tapped from a point which, on the one hand, is connected to zero potential via a charging capacitor $C_3$ and, on the other hand, to a potential point $V_{L1}$ located between the output of rectifier EQ and the output of charging inductance $L_1$ via a diode $D_1$ whose cathode is connected to the charging capacitor $C_3$, and the potential $V_o-V_2$ supplied to controller V is tapped from a point which, on the one hand, is connected to a potential point located between the output of charging inductance $L_1$ and the output of the power supply, preferably to the input of the decoupling inductance $L_2$, via a charging capacitor $C_2$ and, on the other hand, to the potential point $V_{L1}$ between the output of rectifier EQ and the output of charging inductance $L_1$ via a diode $D_2$ whose anode is connected to charging capacitor $C_2$. In this embodiment, no separate auxiliary sources are needed as voltage supplies for controller V, so that the efficiency factor can assume values up to 99.99% and more, since the energy for the supply of the control signal can be taken from the mains virtually loss-free, and be re-transferred to same at a later stage. In particular, if the output current $I_o$ is larger than the predetermined set value, the surplus current is not just simply discharged to the return line, whereby the corresponding energy would be dissipated ineffectively, rather the corresponding energy is, in a certain sense, intermediately stored and used again for interference compensation in the negative direction.

In a preferred improvement of this embodiment, the potential point $V_{L1}$ is tapped from a point located between input and output of charging inductance $L_1$. This enables an optimum voltage tap with respect to the amplitudes of the interfering quantities to be compensated for, for a fixed given size of the possibly already optimised charging inductance $L_1$.

Also preferred is an embodiment where the input line for the potential $V_o+V_1$ supplied to controller V is connected to a positive auxiliary voltage source $+U_H$ via a diode whose cathode is connected to controller V, and where the input line for the potential $V_o-V_2$ supplied to controller V is connected to a negative auxiliary voltage source $-U_H$ via a diode whose anode is connected to controller V. In this way, in the limiting case of starting potential $V_o=0$, which can occur during a start phase or during no-load operation of the controller, the controller is nevertheless still working, although no voltage drop remains across charging inductance $L_1$.

In a further preferred embodiment of the power supply according to the invention, provisions are made for the charging or decharging current respectively of filter capacitor $C_1$ to be measured by means of sensor $F_3$ and the corresponding measuring signal is supplied to control unit CTR, whereby control unit CTR controls rectifier EQ in such a way that the time-integral of the charging or decharging current respectively of filter capacitor $C_1$ is minimum, preferably zero. In this way, a considerably faster control operation of the rectifier is effected, so that the rectifier can relieve the controller in a shorter time. In this way, the output current $I_2$ is minimised more quickly, so that the controller has to be operated in a high amplitude range only for very short times.

The same advantage is reached in a different embodiment whereby the voltage drop across charging inductance $L_1$ is measured by means of a sensor $F_4$ and the corresponding measuring signal is supplied to control unit CTR, whereby control unit CTR controls rectifier EQ in such a way that the time-integral of the voltage drop across charging inductance $L_1$ remains constant.

Particularly preferred is an embodiment whereby the power supply is operated by three-phase alternating current with at least 3-pulse, in particular 6-pulse, preferably 12- or multi-pulse rectification. The controlling speed increases proportionally to the pulse number. In addition, a higher pulse number yields a lower ripple of currents $I_1$, $I_2$, whereby the controller, for its part, need only handle smaller interferring amplitudes. However, the power supply becomes rather complex for more than 12-pulse alternating current operation, so that the 12-pulse variant is considered to be the optimum compromise.

It is particularly easy to effect, given a 3-phase current input into the power supply, a 12-pulse output of the rectifier, if, instead of rectifier EQ, a pair of rectifiers $EQ_1$, $EQ_2$ is provided, one of which ($EQ_1$) is operated in delta, the other one ($EQ_2$) in Y-configuration.

A particularly preferred improvement provides in order to eliminate the DC-premagnetisation of inductance $L_2$, that the partial currents of the two rectifiers $EQ_1$, $EQ_2$ be combined to form the output potential $V_o$ via a summing inductance $L_{2a}$, replacing decoupling inductance $L_2$. Summing inductance $L_{2a}$ no longer needs an air gap and can be constructed considerably more compact with the same inductance value as decoupling inductance $L_2$.

In a preferred operation, the power supply of the invention is particularly suited to drive large magnet and/or gradient coils in nuclear physics. The use of the power supply of the invention is particularly advantageous in the field of nuclear spin resonance (NMR) tomography or NMR spectroscopy, where high and highly stable magnetic fields with a homogeneity of $10^{-6}$ or better have to be produced, whereby the magnetic field strengths can be in the range of 15 T, so that correspondingly high currents for the production of the fields have to be supplied by the power supply. The same applies to units to supply superconducting magnets which mostly need very large currents with high precision.

In the following, the invention is described and explained in detail referring to the embodiments presented in the drawing. In further embodiments, the features derived from the drawing can be used individually or collectively in arbitrary combination.

DESCRIPTION OF THE PREFERRED EMBODIMENT

Figure 1:
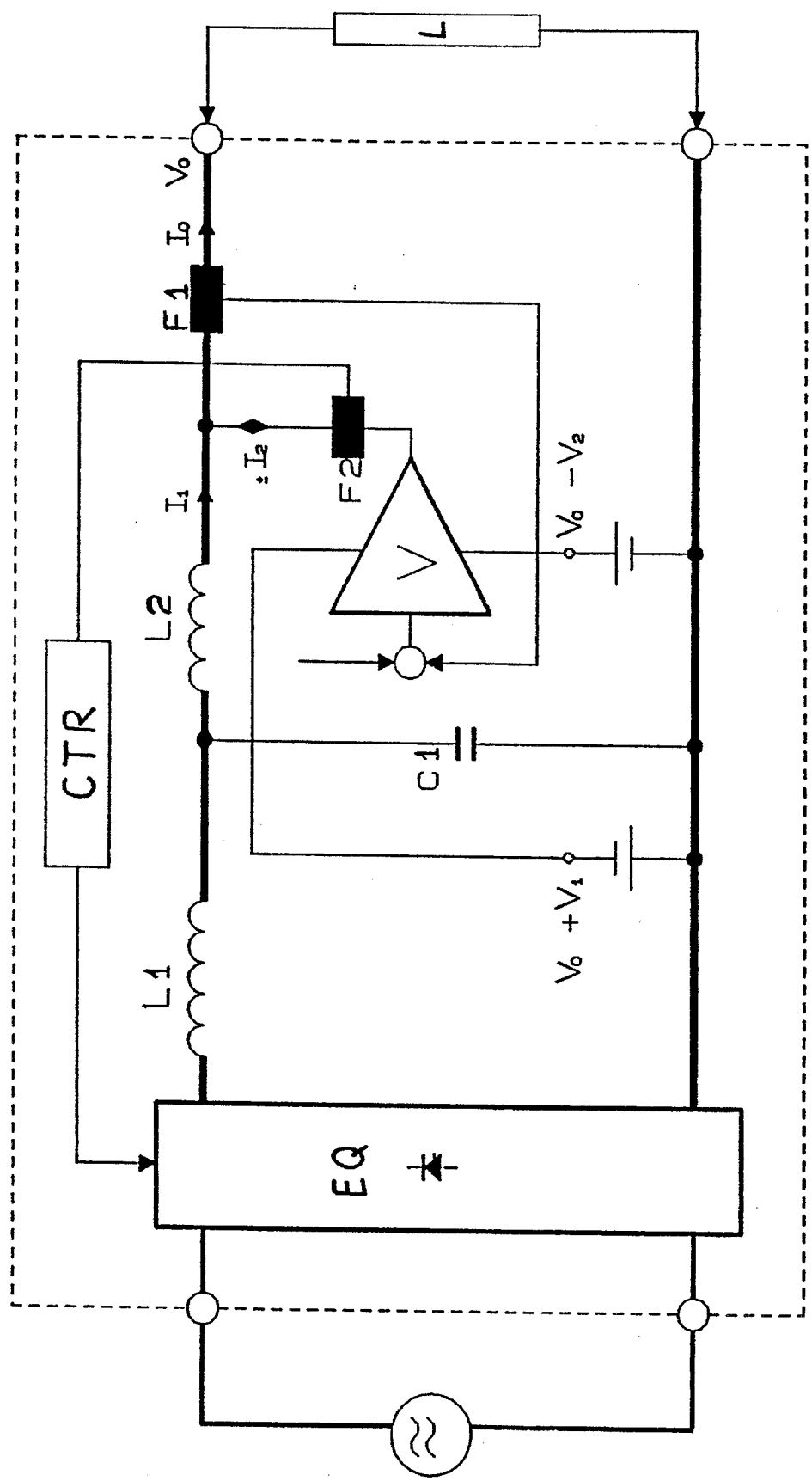
FIG. 1 shows a circuit diagram of a particularly simple embodiment of the power supply according to the invention.

The input of the AC driven power supply shown in FIG. 1 is connected to an AC voltage source and supplies, from its output, a regulated DC current $I_o$ at potential $V_o$ to a load L. The output of a regulated rectifier EQ which, in accordance with the standard requirements of electrical engineering, is selected with the predominant aims of small voltage ripple and a mains feedback via filter capacitor $C_1$ which is as small as possible, feeds a rectified output current $I_1$ to a storage inductance $L_1$ and a downstream decoupling inductance $L_2$, said current $I_1$ being combined into the regulated output DC current $I_o$ at output potential $V_o$ by means of a control current $\pm I_2$ from control amplifier V, the output current $I_o$ being connected via a load L to a return line at zero potential.

Storage inductance $L_1$ is a discrete inductance and is realised in the form of an iron core and a coil with many windings. In the case of pulsating DC current, a premagnetisation at the air gap of the coil in the iron yoke is effected. A minimum inductance limits the current increase in filter capacitor $C_1$. The inductance of storage inductance $L_1$ can be decreased with increasing pulse number of the supplied AC voltage (in FIG. 3 e.g. 12-pulse). For currents of about 10A, the inductance of storage inductance $L_1$ is of the order of mHy, for 1000 A of the order of µHy. Higher values decrease the ripple level across filter capacitor $C_1$. An upper limit is only given by economic considerations, or by requirements for a certain charging time for $C_1$.

Filter capacitor $C_1$ serves for energy storage and is supposed to guarantee a low ripple DC voltage at the output of the power supply. Should the ripple voltage remain limited to a few volts or to some percent of the output voltage $V_o$, respectively, values of 100 to 2000 µF/A relative to the output current $I_o$ are required, depending on the number of possible charging pulses. These high capacitance values of filter capacitor $C_1$ can only be economically realized with electrolytic capacitors.

Decoupling inductance $L_2$ decouples filter capacitor $C_1$ from the output of the power supply. Without this inductance $L_2$, the control amplifier would try to keep the voltage across filter capacitor $C_1$ constant, whereby the controller V itself must supply the ripple currents. If one assumes a ripple of 4 V at 300 Hz across filter capacitor $C_1$, and a constant output voltage $V_o$, the amplifier would have to supply a compensation current of about 200 $mA_{eff}$ for a decoupling inductance of $L_2$=10 µHy. For $L_2$=100 µHy, the current would correspondingly be reduced to 20 $mA_{eff}$.

A commercial operational amplifier with a final power stage can be used for controller V. The short-term current to be supplied by the amplifier is on the order of about 1% and for high power optimized DC current systems about 0.1% of the output current $I_o$. Controller V is bipolar and is driven by a smaller drain voltage $V_o$-$V_2$ and a larger source voltage $V_o$+$V_1$. Its power loss is determined by the selected operation voltage level between $V_1$ and $-V_2$. It amounts, depending on the size of the interference amplitudes to be compensated, to about 10% of $V_o$ or, alternatively, 10 Volts in order to be able to store sufficient energy in capacitors $C_2$ and $C_3$. The controller power loss, relative to the output power, amounts therefore for higher operating voltages to 0.1% for small single phase systems and can be decreased to below 0.01% for large optimized multi-phased systems. Because of this, controller V operates essentially loss-free.

The circuit shown in FIG. 1 contains a highly precise control loop, with which the output current $I_o$ is tapped by means of a sensor $F_1$ and supplied to controller V as feedback value via a set value-actual value comparator. The output of controller V is electrically connected to the output of the power supply. The current paths of the amplifier output, as far as they are detected by sensor $F_1$, must be closed via load L to the potential sources $V_o$+$V_1$ and $V_o$-$V_2$. The decoupling inductance $L_2$ prevents, as mentioned above, the filter capacitor $C_1$ from being AC coupled to the output. Thereby the controller V need not perform filter functions.

Controller V is responsible for the high precision (constant current precision) over the entire frequency range including the frequencies below 1 Hz to DC voltage. In the present context, "high precision" means a maximum deviation of less than 0.1% in less than one second from a preselectable set value. The frequency response of controller V for frequencies above 1 Hz corresponds to the requirements of a stable control loop.

Controller V is limited in its correction power $V_1.I_2$ or $V_2.I_2$, since $\pm I2 \ll I_o$. Therefore, controller V must be load-relieved in the lower frequency range by a second loop. In particular, the DC current for the correcting range ($V_{omin}$, $V_{omax}$) has to be taken over by this second loop. The load-relief limit is given by the theoretically possible bandwidth (pulse number.mains frequency). Above this limiting frequency of the rectifier-controller, the controller V has to supply the entire correcting power. Therefore, in the circuit of FIG. 1, apart from the highly precise control loop, a dynamic control loop is also provided for, with which the output current $I_2$ of the controller in the output line of controller V is measured by a sensor $F_2$ and supplied to the controlled rectifier EQ via a rectifier control unit CTR. In addition, the elements $L_1$, $C_1$ and $L_2$ belong to the dynamic control loop. The dynamic control loop is supposed to be optimized in such a way that, to a large extent it effects a reduction of the output current $I_2$ of controller V. In particular, its DC current component should go to zero as accurately as possible.

The further frequency dependent relief of controller V corresponds to a frequency response of the second loop which results from the criteria for the stability of this control loop. In particular, the number of charging pulses from rectifier EQ, for a given frequency, increases the dynamic range.

The efficiency of the entire unit is to an essential degree determined by the way in which the two potentials $V_o$+$V_1$ and $V_o$-$V_2$ supplied to controller V are created. The two potentials should approximately symmetrically follow the output potential $V_o$ if $C_2 \approx C_3$, and should adapt to the load of the unit. The two partial voltages $V_1$ and $-V_2$ have, relative to $V_o$, different polarity, and their magnitudes are about the same and very much smaller than $V_o$, but always about 10 Volts.

Figure 2:
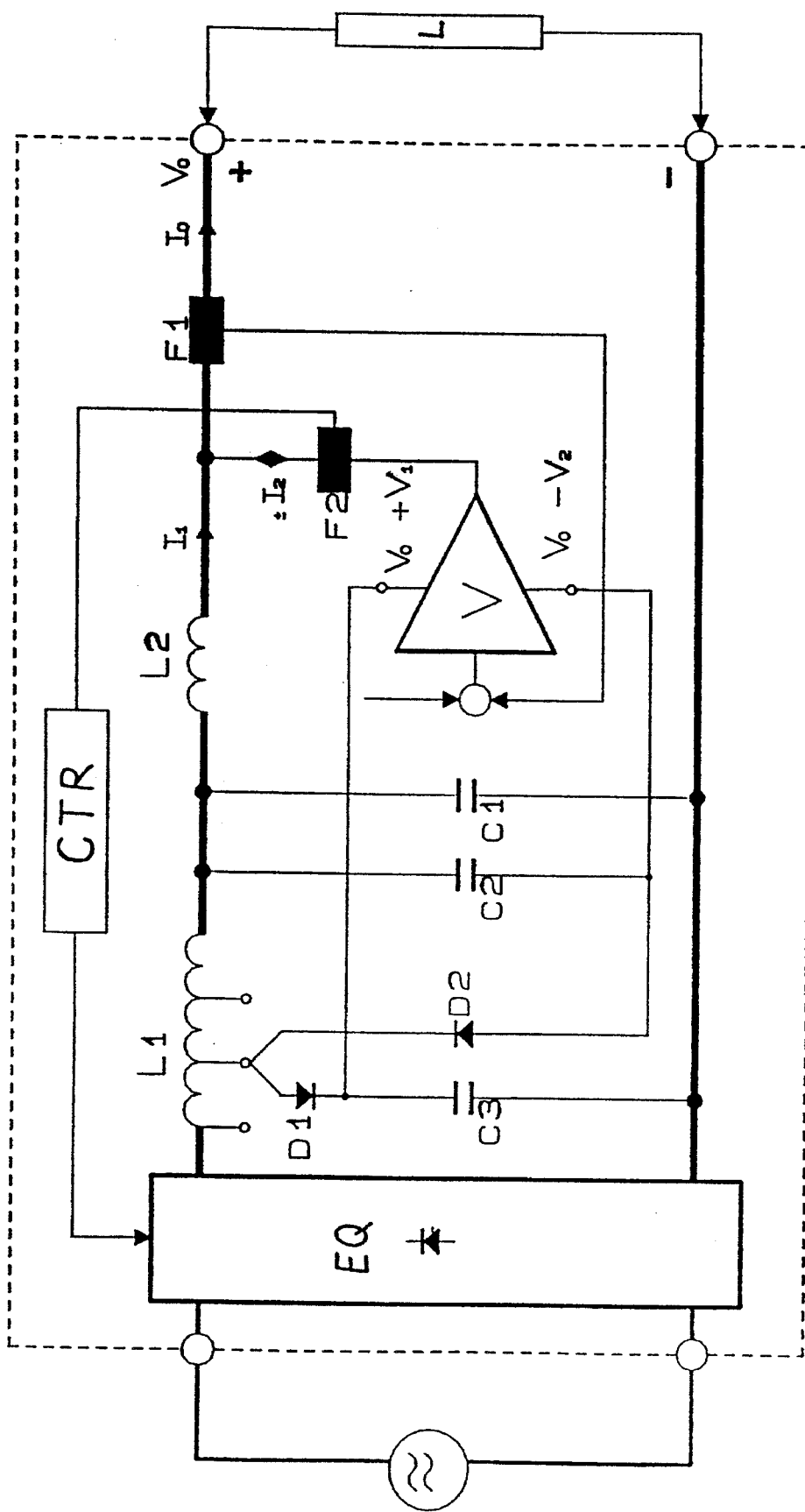
FIG. 2 shows a circuit diagram of the power supply according to the invention with intermediate energy storage of the supply voltages supplied to the controller for interference compensation.

In the power supply shown in FIG. 2, rectifier EQ supplies, in correspondence with the control pulse given by the rectifier control unit CTR, a potential which is larger than $V_o$ to the input of storage inductance $L_1$. Thereby, the size of the difference corresponds to the load conditions, i.e. to the size of the expected interference amplitudes. The potential is transferred to storage capacitor $C_3$ by means of a diode $D_1$. At the end of a charging period, a negative voltage with respect to the potential at storage capacitor $C_3$ appears across storage inductance $L_1$. A further storage capacitor $C_2$ is discharged via diode $D_2$ to this potential. Preferably continuous taps at storage inductance $L_1$ allow for an optimization of these potentials for selected capacitance values for $C_2$ and $C_3$.

Figure 3:
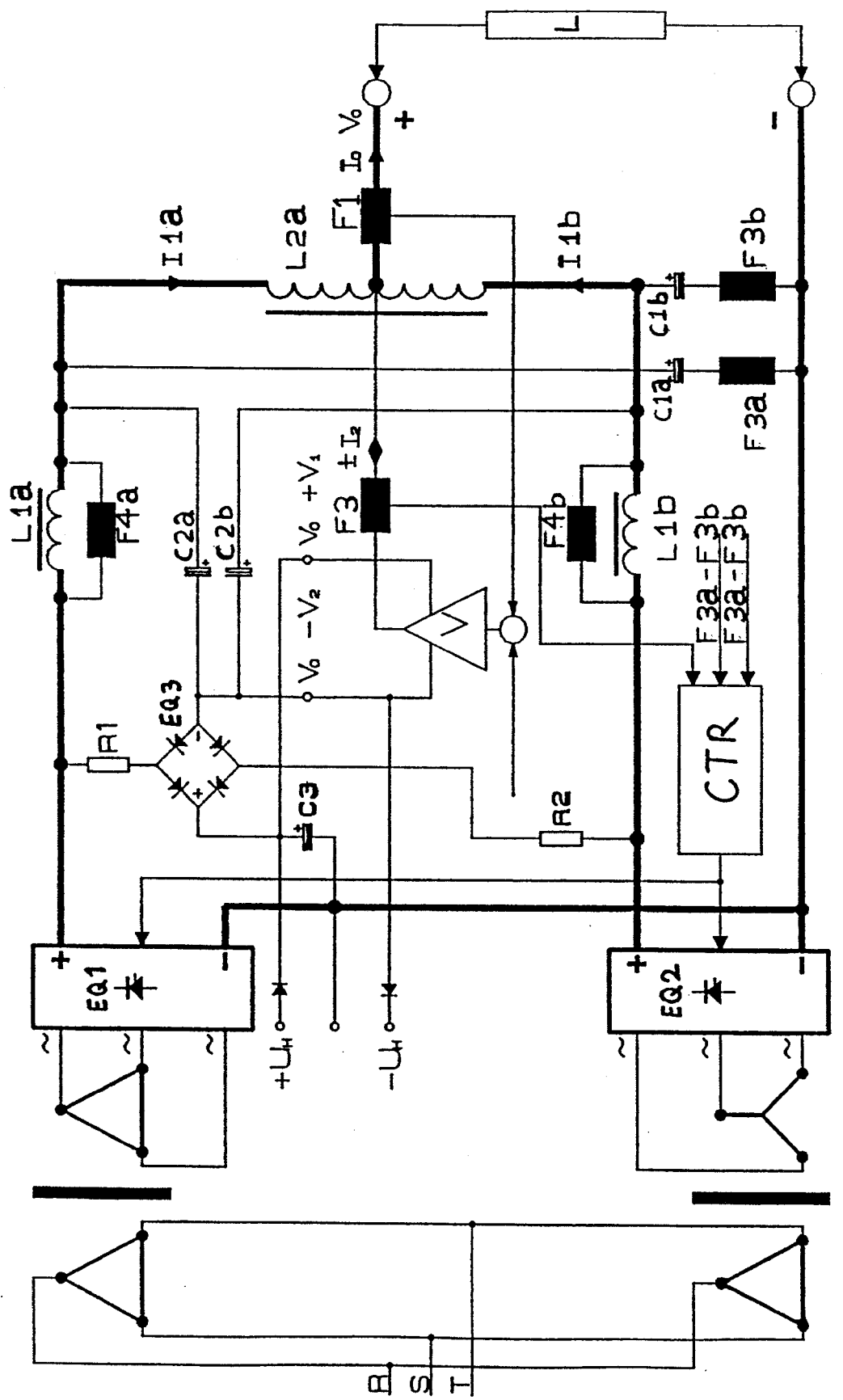
FIG. 3 shows a circuit diagram of the power supply according to the invention with 3-phase current input and 12-pulse connection to the rectifier.

As already explained, the load and therefore the power consumption of controller V is reduced for larger dynamic range of the DC processing. FIG. 3 shows an embodiment of the power supply according to the invention with a higher-pulse rectification. A 3-phase current is supplied to the power supply of FIG. 3, which is directed from the secondaries of two corresponding transformers via a delta-configuration to a first rectifier $EQ_1$, and via a Y-configuration to a second rectifier $EQ_2$. In this way, the primary 3-phase input AC current is transformed to a secondary 12-pulse current supply.

A summing inductance $L_{2a}$ takes over the task of decoupling inductance $L_2$, whereby, because of the approximate identity of both partial currents $I_{1a}$ and $I_{1b}$ supplied to summing inductance $L_{2a}$, the DC premagnetisation of the inductance is removed, so that an air gap is no longer necessary. In this way, the summing inductance $L_{2a}$ can be constructed considerably more compact with the same inductance value.

In the embodiment shown in FIG. 3, the positive potential $V_o+V_1$ supplied to controller V via a rectifier bridge circuit $EQ_3$, is predominantly taken from that one of the two rectifiers $EQ_1$ or $EQ_2$ which yields the higher positive potential. The storage capacitors $C_{2a}$ and $C_{2b}$ are decharged via rectifier bridge $EQ_3$ into the storage inductance $L_{1a}$ or $L_{1b}$ with the actually lower current load. Resistors $R_1$ or $R_2$ increase the conducting interval. Two auxiliary voltages $U_H$ and $-U_H$ guarantee the supply of controller V during no-load operation or during the starting phase of the unit or, for very small operating voltages $V_o$ (about 20 Volts), they can completely take over the generation of the potentials $V_o+V_1$ and $V_o-V_2$.

For further improvement of the dynamic range, information about the charging and decharging currents, of the two filter capacitors $C_{1a}$ and $C_{1b}$, respectively or about the voltage drops across the two storage inductances $L_{1a}$ and $L_{1b}$, can be supplied to the rectifier control unit CTR via further sensors $F_{3a}$, $F_{3b}$ as well as $F_{4a}$ and $F_{4b}$. Control unit CTR then controls rectifiers $EQ_1$ or $EQ_2$, in such a way that the time integral of the charging or decharging current, of filter capacitors $C_{1a}$ and $C_{1b}$ respectively becomes minimum, preferably zero, and that the time integral of the voltage drop across storage inductances $L_{1a}$ and $L_{1b}$ remains constant. In this way, rectifiers $EQ_1$ and $EQ_2$ can quickly relieve controller V, so that its output current $I_2$ can be minimised correspondingly faster.

With the mains rectifier of the invention, a high precision can be obtained due to the large bandwidth of the control loop. In this way, the output current $I_o$ can, relative to a set value, be readjusted within a second so that the deviation is no larger than 0.01%. In addition, the power supply of the invention operates nearly loss-free, i.e. with an extremely high efficiency. Since the construction of the control element is relatively uncomplicated and contains a commercial operational amplifier as frequency-determining element, the power supply is particularly stable and shows no tendency towards oscillations.

A particularly preferred field of operation of the above described power supply is the operation of large magnet and/or gradient coils. In particular, such coils can be used in the field of nuclear spin resonance (NMR) apparatuses like tomographs or spectrometers. A further advantageous use is in the field of particle accelerators, where large currents with as low losses as possible also have to be controlled with high precision, or in the field of superconducting magnets.

We claim:

1. In an improved power supply of the kind having an AC current input and an output, the output having an output line at an output potential ($V_o$) and a return line at zero potential, the power supply being adapted to supply a regulated output DC current to a load, with a bi-polar controller, having an output generating a control current, and a first sensor, the controller and the first sensor being adapted to control, via the control current, an instantaneous value, measured by the first sensor, of a control variable to a predetermined setting within a tolerance of less than 0.1% at 1 Hz, and with an adjustable rectifier means, a filter capacitor, and a storage inductor connected between the rectifier means and the filter capacitor, whereby the control current is electrically connected to the output line of the power supply output, the improvement comprising a decoupling inductor means adapted to AC decouple the controller output from the filter capacitor, a first potential means for supplying a first potential ($V_o+V_1$) to the controller, a second potential means for supplying a second potential ($V_o-V_2$) to the controller, a second sensor for measuring the control current and for generating a second sensor output signal, and a control unit being connected to the second sensor and to the adjustable rectifier means, the control unit being adapted to regulate, using the second sensor output signal, the adjustable rectifier means to minimize a mean value of the control current.

2. The power supply of claim 1, wherein the first potential means comprises a first charging capacitor connected to the return line, a first potential first tap means connected between an output of the rectifier means and an output of the storage inductor, a first diode having an anode connected to the first potential first tap means, and a cathode connected to the first charging capacitor, and a first potential second tap means connected between the diode and the charging capacitor, whereby the first potential is tapped from the first potential second tap means, and wherein the second potential means comprises a second potential tap means connected between the storage inductor and the output line, a second storage capacitor connected between the second potential tap means and the controller, and a second diode having a cathode connected to the first potential tap means and an anode connected to the controller.

3. The power supply of claim 2, wherein the first potential first tap means is connected between an input and the output of the storage inductor.

4. The power supply of claim 1, wherein the first potential means comprises a positive auxiliary voltage source and a third diode connected between the positive auxiliary voltage source and the controller, and the second potential means comprises a negative auxiliary voltage source and a fourth diode connected between the negative auxiliary voltage source and the controller.

5. The power supply of claim 1, further comprising a third sensor connected to the filter capacitor and to the control unit, the third sensor being adapted to measure at least one of a filter capacitor charging and discharging current and to generate a third sensor output signal to the control unit, whereby the control unit regulates the adjustable rectifier means to minimize a time-integral of at least one of the filter capacitor charging and discharging current.

6. The power supply of claim 1, further comprising a fourth sensor connected across the storage inductor and adapted for measuring a voltage drop across the storage inductor and for generating a fourth sensor output signal to the control unit, whereby the control unit regulates the adjustable rectifier means to keep a time-integral of the voltage drop across the storage inductor constant.

7. The power supply of claim 1, wherein the AC current input comprises a three-phase alternating current having at least three pulses.

8. The power supply of claim 7, wherein the adjustable rectifier means comprises a first rectifier means operated in delta configuration and a second rectifier means operated in Y-configuration.

9. The power supply of claim 8, wherein the decoupling inductor means comprises a summing inductor adapted to combine a first rectifier current from the first rectifier means and a second rectifier current from the second rectifier means.

10. The power supply of claim 1, wherein the power supply output potential ($V_o$) and the power supply output DC current produce a power output in excess of 1 kW.

11. The power supply of claim 1, wherein the power supply output DC current exceeds 10 A.

12. The power supply of claim 1, wherein the load comprises one of a large magnet and gradient coils.

13. The power supply of claim 12, wherein the load comprises elements of one of a nuclear magnetic resonance tomography system, a nuclear magnetic resonance spectrometer, and a particle accelerator.

* * * * *